US008097828B2

(12) United States Patent
Roberts et al.

(10) Patent No.: US 8,097,828 B2

(45) Date of Patent: Jan. 17, 2012

(54) DIELECTRIC DEVICES FOR A PLASMA ARC TORCH

(75) Inventors: Jesse A. Roberts, Cornish, NH (US); Michael F. Kornprobst, Lebanon, NH (US); David Jonathan Cook, Bradford, VT (US)

(73) Assignee: Hypertherm, Inc., Hanover, NH (US)

( * ) Notice: Subject to any disclaimer, the term of this patent is extended or adjusted under 35 U.S.C. 154(b) by 1011 days.

(21) Appl. No.: 11/645,127

(22) Filed: Dec. 22, 2006

(65) Prior Publication Data

US 2007/0262060 A1 Nov. 15, 2007

Related U.S. Application Data

(63) Continuation-in-part of application No. 11/432,282, filed on May 11, 2006, now Pat. No. 7,598,473.

(60) Provisional application No. 60/825,477, filed on Sep. 13, 2006.

(51) Int. Cl.
*B23K 10/00* (2006.01)

(52) U.S. Cl. .................. 219/121.5; 219/75; 219/121.51; 219/121.52; 219/121.48; 313/231.41

(58) Field of Classification Search ............... 219/121.5, 219/121.51, 121.49, 121.48, 121.52, 74, 219/75; 313/231.31, 213.41
See application file for complete search history.

(56) References Cited

U.S. PATENT DOCUMENTS 3,430,837 A * 3/1969 Hein ............................... 228/53
3,659,076 A * 4/1972 Ogden, Sr. ............... 219/137.42
4,672,163 A * 6/1987 Matsui et al. ................... 219/74
5,034,593 A * 7/1991 Rice et al. ................ 219/137.43
5,164,568 A 11/1992 Sanders
5,208,448 A 5/1993 Everett
5,451,739 A 9/1995 Nemchinsky et al.
5,628,924 A 5/1997 Yoshimitsu et al.
6,096,992 A * 8/2000 Severance, Jr. ............ 219/121.5
6,118,097 A 9/2000 Kaga et al.
6,172,323 B1 1/2001 Ishide et al.
6,610,959 B2 8/2003 Carlson et al.
6,639,174 B2 10/2003 Augeraud et al.
6,667,459 B1 12/2003 Woods et al.
6,774,336 B2 8/2004 Horner-Richardson et al.
6,924,004 B2 8/2005 Rao et al.
2001/0025833 A1* 10/2001 Kelkar et al. .............. 219/121.5
(Continued)

FOREIGN PATENT DOCUMENTS

EP 0941018 A2 3/1999
(Continued)

OTHER PUBLICATIONS

Invitation to Pay Additional Fees from PCT/US2007/067290 dated Oct. 8, 2007 (4 pgs.).

(Continued)

*Primary Examiner* — Mark Paschall
(74) *Attorney, Agent, or Firm* — Proskauer Rose LLP

(57) ABSTRACT

Apparatus and methods for thermally processing a workpiece include directing a plasma arc to the workpiece and using a dielectric shield or dielectric coating to protect a forward portion (e.g., a torch head) of a plasma arc torch. The dielectric shield or dielectric coating covers a nozzle disposed within the torch head and protects the nozzle from the effects of slag and double arcing. The shield also improves operator visibility due to the spatial relationship between the dielectric shield and the nozzle.

31 Claims, 10 Drawing Sheets

U.S. PATENT DOCUMENTS

| | | | | |
|---|---|---|---|---|
| 2002/0150669 | A1 | 10/2002 | Pui et al. | |
| 2004/0169018 | A1 | 9/2004 | Brasseur et al. | |
| 2004/0177807 | A1 | 9/2004 | Pui et al. | |
| 2005/0082263 | A1 | 4/2005 | Koike et al. | |
| 2006/0016914 | A1 | 1/2006 | Bach et al. | |
| 2007/0090168 | A1 * | 4/2007 | Snow et al. | 228/101 |

FOREIGN PATENT DOCUMENTS

| | | | |
|---|---|---|---|
| EP | 1395097 | A2 | 3/2004 |
| EP | 1524887 | A2 | 4/2005 |
| FR | 2703557 | A1 | 3/1993 |
| WO | 03/089178 | A1 | 10/2003 |
| WO | 2006/039890 | A2 | 4/2006 |

OTHER PUBLICATIONS

Invitation to Pay Additional Fees from the International Searching Authority.

* cited by examiner

DIELECTRIC DEVICES FOR A PLASMA ARC TORCH

RELATED APPLICATIONS

This application is a continuation-in-part of U.S. Ser. No. 11/432,282 entitled "Generating Discrete Gas Jets in Plasma Arc Torch Applications," filed on May 11, 2006. This application claims the benefit of U.S. Provisional Application Ser. No. 60/825,477, entitled "Dielectric Shield for a Plasma Arc Torch," filed on Sep. 13, 2006. The entire disclosures of U.S. Ser. Nos. 60/825,477 and U.S. Ser. No. 11/432,282 are incorporated herein by reference.

TECHNICAL FIELD

The invention relates to use of a dielectric device with a plasma arc torch. Specifically, the invention relates to a dielectric device positioned relative to, or on a nozzle such that operator visibility of the plasma arc is increased and the risk of double arcing is decreased.

BACKGROUND

Plasma arc torches are widely used in the cutting, welding and heat treating of metallic materials. A plasma arc torch generally includes a cathode block with an electrode mounted therein, a nozzle with a central exit orifice mounted within a torch body, a shield, electrical connections, passages for cooling and arc control fluids, a swirl ring to control fluid flow patterns in the plasma chamber formed between the electrode and nozzle, and a power supply. The torch produces a plasma arc, which includes a constricted ionized jet of a conductive plasma gas with high temperature and high momentum. The plasma gas, when energized by a DC source, forms a current path between the electrode and the nozzle (positive potential) creating the plasma arc pilot. Placing the nozzle near the workpiece causes the current path to flow between the workpiece and the electrode because the workpiece rests at a higher positive potential then the nozzle. Many of the torch components are consumable in that they deteriorate over time and require replacement. These "consumables" include the electrode, swirl ring, nozzle, retaining cap, and shield.

Frequently during torch operation, the operator is constrained by space or visibility, which may lead to inadvertent contact of the side of the nozzle to the workpiece resulting in "double arcing." Double arcing is a condition where the plasma arc deviates from its intended electrode to workpiece path and instead goes from the electrode to the nozzle and then to the workpiece—causing electrical continuity between the nozzle and the workpiece. Double arcing causes premature wear to the nozzle and results in frequent nozzle replacement and additional expense. In addition, double arcing can cause nozzle stickiness, which inhibits accurate hand control of the torch. The use of a shield, which is electrically floating, around the nozzle helps to eliminate the risk of double arcing, but currently available shields have undesirable limitations.

Despite nozzle shields being pervasive in the commercial market, they are often bulky and inhibit visibility of the plasma arc by the operator. One design difficulty for conductive shields is establishing a sufficient dielectric gap. That is, a conductive shield must be positioned or spaced away from the nozzle to prevent the plasma arc from jumping from the nozzle to the shield. The desired gap or distance between the shield and nozzle is a function of the dielectric strength of the medium within the gap, gas dynamics, metal contamination within the gap, tolerance stack up, and the physical condition of the shield and/or nozzle. The arcing distance is the minimum distance required between a conductive shield and a nozzle to prevent the plasma arc from jumping the gap between the shield and the nozzle. In conventional torches, the conductive shield is positioned at least an arcing distance away from the nozzle causing the total covered volume surrounding the plasma arc to be large, thereby reducing operator visibility.

A ceramic shield can be used in place of a conductive shield, but problems associated with these consumables exist. One difficulty with ceramic shields in plasma arc torch systems, despite their ability to solve the spacing and electrical isolation problems, is that they cannot withstand the thermal and impact shocks that occur during normal industrial use. In addition, ceramic shields are generally bulky and therefore decrease operator visibility. Moreover, ceramic shields are often too brittle for most hand torch systems.

SUMMARY OF THE INVENTION

The subject matter of the invention generally relates to devices for protecting the nozzle in a plasma arc torch. In particular, the devices protect the nozzle by decreasing or eliminating double arcing events. In addition, the devices protect the nozzle by decreasing damaging interactions between the nozzle and the workpiece by increasing operator visibility. In one aspect, the invention relates to a dielectric shield for a plasma arc torch including a nozzle. At least a portion of the shield can include a non-ceramic substrate and a dielectric coating disposed on the non-ceramic substrate. The dielectric shield is sized to inhibit protrusion of the nozzle pass an end face of the dielectric shield.

Embodiments of this aspect of the invention can include one or more of the following features. The non-ceramic substrate can be a metal, such as, for example, copper, aluminum, steel, or an alloy. In certain embodiments, the non-ceramic substrate includes an electrically conductive material. In one embodiment, at least a portion of the dielectric shield includes a dielectric coating of an anodized material. The anodized material can be, for example, anodized aluminum or anodized copper. The dielectric coating can be formed of a ceramic layer, such as, for example a deposited layer of aluminum oxide. In some embodiments, the dielectric shield is made out of a composite material including a metallic inner substrate and an outer layer of ceramic. In another embodiment, the shield includes multiple coatings, which can be layered. The dielectric coating can be on an interior surface of the shield, on an exterior surface of the shield, over an entirety of the shield, and/or on an end face of the shield body. In another embodiment, the dielectric shield can have spring tangs for connecting or disconnecting the shield from the plasma arc torch. The shield can include multiple connecting portions, or multiple disconnecting portions, or both multiple connecting and disconnecting portions. The connecting and disconnecting portions allowing for portions of the dielectric shield to be replaced without having to replace the entire dielectric shield.

Another aspect of the invention relates to a torch head for a plasma arc torch for processing a metallic workpiece. The torch head includes a nozzle and an electrode and, in some embodiments, a shield. The nozzle of the torch head is mounted relative to an electrode in a torch body to define a plasma chamber in which a plasma arc is formed. The nozzle includes a conductive nozzle body portion and defines a nozzle exit orifice extending therethrough. The shield of the torch head is capable of being secured to the torch body such that at least a portion of a surface of the shield directly contacts the nozzle body portion. The shield is sized to inhibit protrusion of the nozzle pass an end face of the shield and at least partially defines a cooling passage for providing a cooling gas to the torch head. The shield includes a non-ceramic body and a dielectric coating disposed on at least a portion of the non-ceramic body.

Embodiments of this aspect of the invention can include one or more of the following features. The non-ceramic body of the shield can be form of an electrically conductive material, a metal, an alloy, or a conductive plastic. In certain embodiments, the non-ceramic body comprises a polymer, a plastic, a metal, or an alloy. In some embodiments, the non-ceramic body is conductive. In certain embodiments, the shield includes an anodized body. That is, the non-ceramic body portion of the shield is formed of a metallic material and the dielectric coating disposed on at least a portion of the non-ceramic body is an oxide layer formed from the anodization of the metallic material. In some embodiments, the shield is formed of an anodized aluminum body. In some embodiments, the dielectrically coated surface is an interior surface of the shield. The shield can electrically isolate the nozzle body portion, e.g., from double arcing.

Another aspect of the invention relates to a torch head for a plasma arc torch for processing a metallic workpiece. The torch head includes a nozzle mounted relative to an electrode in the torch body, thereby defining a plasma chamber in which a plasma arc can be formed. The nozzle includes a conductive nozzle body portion and defines a nozzle exit orifice extending therethrough. The shield of the torch head includes a non-ceramic portion, a dielectric portion, and an end face portion. The dielectric shield portion can inhibit the nozzle body portion from extending pass the end face and preventing arcing within the torch head when the shield is secured within an arcing distance of the nozzle.

Embodiments of this aspect of the invention can include one or more of the following features. In one embodiment, the non-ceramic portion of the shield is formed from an electrically conductive material, such as, for example, a metallic material or a conductive plastic material. In another embodiment, the non-ceramic portion of the shield is formed from a non-conductive material, such as, for example, a non-conductive polymer or plastic. The shield can include an anodized body, such as anodized aluminum body or a anodized copper body. In one embodiment, the shield is configured for cooling by a secondary or shield gas supplied from the plasma arc torch.

Yet another aspect of the invention relates to a nozzle for a plasma arc torch. The nozzle is adapted to be mounted relative to an electrode in a torch body, thereby defining a plasma chamber. The nozzle includes a hollow nozzle body portion and a nozzle head portion in contact with the nozzle body portion. The nozzle head portion defining a nozzle exit orifice extending therethrough. A surface of the nozzle head portion includes one or more dielectric coating(s) disposed thereon.

Embodiments of this aspect of the invention can include one or more of the following features. In one embodiment, the dielectric coating is applied to an exterior surface of the nozzle head portion. The nozzle can include multiple coatings disposed on the surface of the nozzle. In certain embodiments, all of the multiple coatings are dielectric coatings. In certain embodiments, the dielectric coating is applied to an exterior surface of the nozzle head portion and the nozzle body portion. The dielectric coating need not be applied to an interior surface of the nozzle head portion. The hollow nozzle body portion and/or the nozzle head portion can include copper. In one embodiment, the nozzle head portion can include at lest one of copper or aluminum. In certain embodiments, the nozzle body portion and the nozzle head portion are integrally formed. That is, the nozzle body portion and the nozzle head portion are formed as a single piece.

Another aspect of the invention relates to a method of protecting a plasma arc torch that includes an electrode and a nozzle disposed within a torch body. The method includes the steps of securing a shield including a non-ceramic substrate and a dielectric coating to the torch body between the workpiece and at least a portion of the nozzle. The method also includes the step of cooling the shield with a gas flowing through the torch body. In one embodiment, the shield includes a metallic, conductive substrate. In another embodiment, a surface of the shield contains anodized aluminum.

Another aspect of the invention relates to a method of protecting a plasma arc torch including an electrode. The method includes mounting a nozzle relative to the electrode in a torch body to define a plasma chamber, the nozzle including a nozzle body portion and a nozzle head portion in contact with the nozzle body portion. The nozzle defining a nozzle exit orifice extending through the nozzle head portion. An exterior surface of the nozzle head portion includes a dielectric coating disposed thereon. For example, the nozzle head portion can be formed of an anodized metal to provide a conductive nozzle head portion with a dielectric coating disposed thereon. The method further includes cooling the nozzle with a gas flowing over a portion of the exterior surface of the nozzle head portion. In one embodiment, the method also includes securing a shield to the nozzle. In an alternative embodiment, the method does not include securing a shield. That is, the plasma arc torch is used without a shield.

There are numerous advantages to the aspects of the invention described above. For example, the dielectrically coated shields and/or nozzles described above electrically insulate the nozzles from the workpieces. As a result, double arcing events are reduced and in some embodiments eliminated. In addition, the width of the torch head (i.e., the overall width of the combined electrode, nozzle, and shield) is reduced, thereby increasing operator visibility. Another advantage of using a dielectric device that includes a non-ceramic substrate and a dielectric coating is increased impact and thermal resistance. In conventional torches with non-conducting, ceramic shields, damage to the ceramic shields occurs often due to its brittle nature and inability to withstand thermal abuse. In the present invention, the dielectric devices provide comparable electrical isolation as ceramic shields, however, the dielectric devices in accordance with the invention can withstand greater impacts and thermal stresses due to the underlying non-ceramic substrate. In certain embodiments, convenience and efficiency are increased by include spring tangs and/or connecting and disconnecting portions of the shield. That is, a shield with spring tangs and/or connecting and disconnecting portions can be quickly and easily attached and removed from a torch body, thereby saving operational costs. In addition, shields including connecting and disconnecting portions can be piecemeal replaced. That is, as a portion of the shield wears away or becomes covered in slag, that portion can be removed and replaced without sacrificing the entire shield.

DETAILED DESCRIPTION

The present invention features a device for a plasma arc torch that minimizes the possibility of double arcing and maximizes cutting accuracy by improving operator visibility and edge starting (i.e., minimizing nozzle stickiness).

Figure 1A:
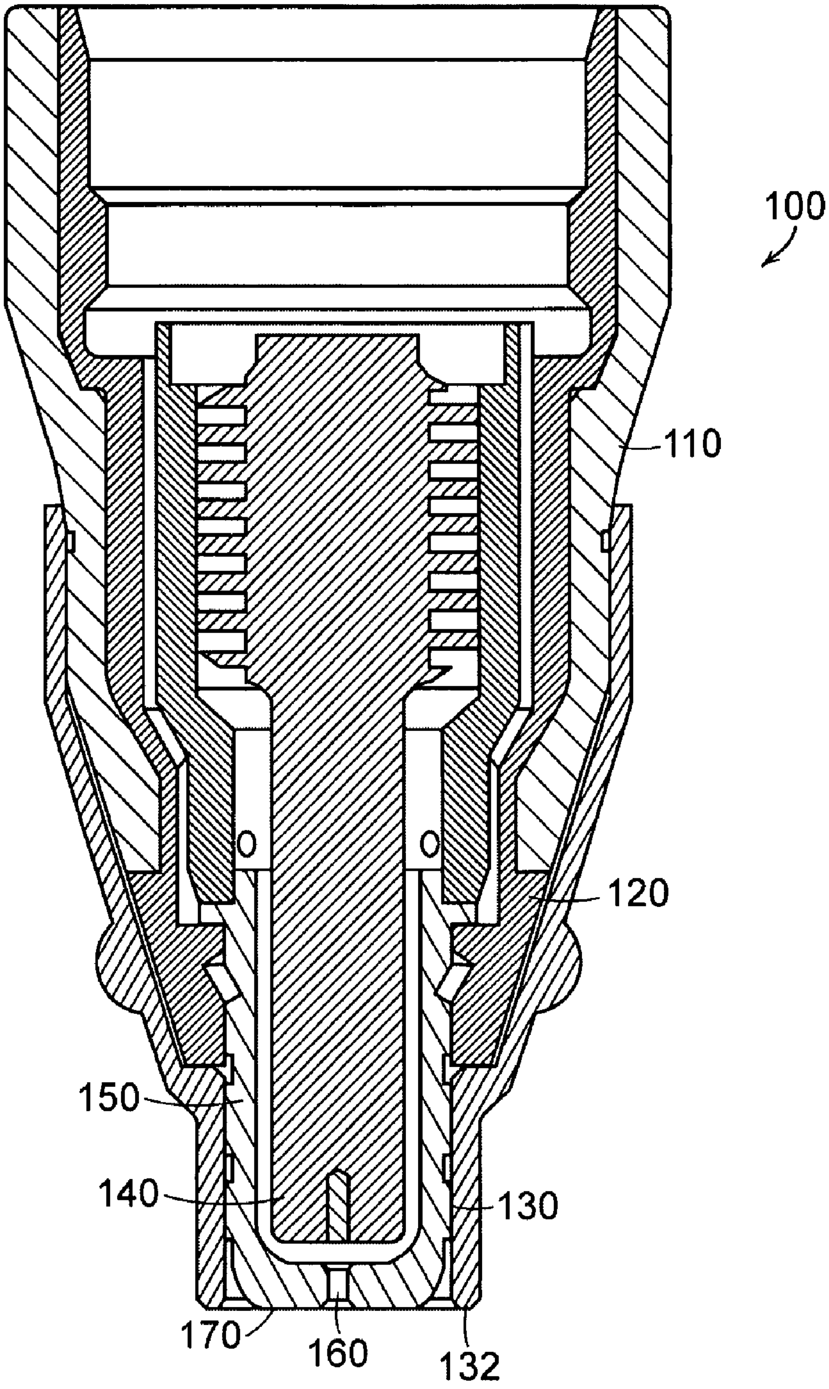
FIG. 1A is a vertical cross sectional view of an embodiment of a portion of a plasma arc torch with an electrode, a nozzle with a central exit orifice, a retaining cap, and a shield positioned relative to the nozzle.

FIG. 1A shows a vertical cross sectional view of one embodiment of a plasma arc torch 100. The torch includes an electrode 140, a nozzle 150 with a central exit orifice 160, a retaining cap including an inner portion 120 and an outer portion 110, and a dielectric shield 130. The dielectric shield 130 can be positioned to contact the nozzle 150 without the threat of double arcing, due to the non-conductive nature of dielectric materials. That is, the dielectric shield 130 electrically insulates the conductive nozzle 150. The dielectric shield 130 extends at least to the end face of the nozzle 170 and is sized so that the nozzle 150 does not protrude pass an end face 132 of the shield 130. The plasma arc torch 100 produces a plasma arc, which is an energized conductive plasma gas that forms a current path between the electrode 140 and a workpiece. During torch start up, a current flows between the electrode 140 and the nozzle 150 facilitating the formation of a plasma arc pilot from gas flowing within a plasma chamber (i.e., a space between the nozzle 150 and the electrode 140). Positioning the nozzle 150 near the workpiece causes the arc to transfer, such that the torch current flows between the electrode 140 and the workpiece due to electrical potential of the workpiece. The dielectric shield 130 prevents double arcing caused by the formation of a second current path, protects the nozzle 150 and retaining cap 110 and 120 from slag, and protects the nozzle 150 and electrode 140 from the damaging effects of a torch head/workpiece collision.

In order to minimize the dielectric shield's 130 bulkiness and at the same time provide the shield with enough strength and rigidity to withstand use in the plasma arc torch, the dielectric shield is formed of multiple materials (i.e., is a composite material). For example, the body or substrate of the dielectric shield 130 can be formed of an electrically conductive, resilient material (e.g., a non-ceramic material, such as a metal, alloy, or conductive plastic) and a dielectric or insulative material (e.g., a ceramic coating) can be disposed over at least one surface (e.g., a surface adjacent to the nozzle 150, the end face 132 of the shield) of the body of the shield 130. The dielectric coating on the body of the shield 130 allows for positioning of the shield in direct contact with or proximate to the nozzle 150, while still reducing or eliminating double arcing.

Figure 1B:
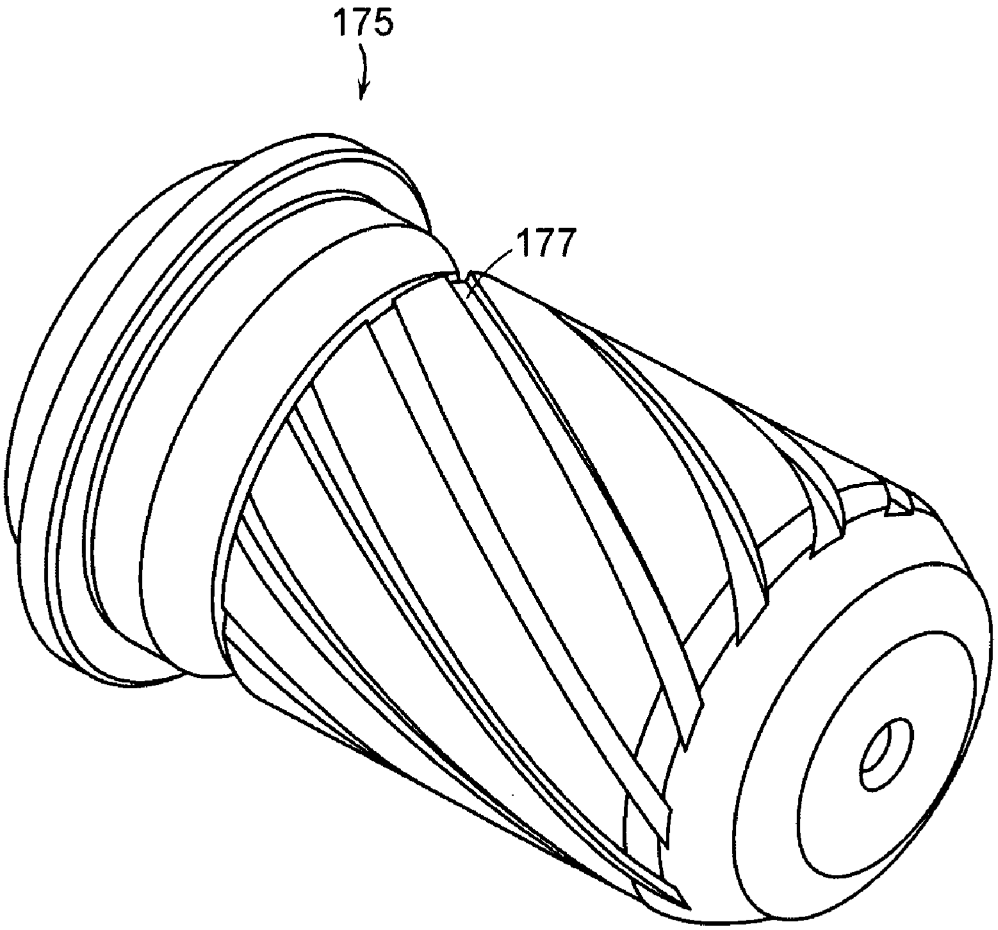
FIG. 1B is a perspective view of a nozzle with flutes that allow for a secondary gas passage when the dielectrically coated shield having a non-ceramic substrate is in contact with the nozzle.

The dielectric shield 130 can be positioned relative to the nozzle 150 such that at least portion of an interior surface of the shield directly contacts the nozzle. FIG. 1B shows a nozzle 175 with flutes 177. The flutes 177 form a secondary gas passage, which can allow for the flow of gas (e.g., plasma arc cooling gas or plasma arc shield gas) while the dielectric shield 130 directly contacts the nozzle 150. The cooling gas is commonly used to cool the nozzle or impinge on the plasma arc. An example of a nozzle with flutes is shown in U.S. application Ser. No. 11/432,282. There are several advantages to having the dielectric shield 130 in contact with the nozzle 150 or 175, such as higher operator visibility, lack of an otherwise required shield assembly, and longer nozzle and shield life. In addition, contact between the dielectric shield 130 and nozzle 150 can prevent slag from wedging in between the nozzle 150 and the dielectric shield 130. Slag prevention reduces the risk of double arcing, thereby allowing the nozzle end face 170 to be exposed.

Figure 2A:
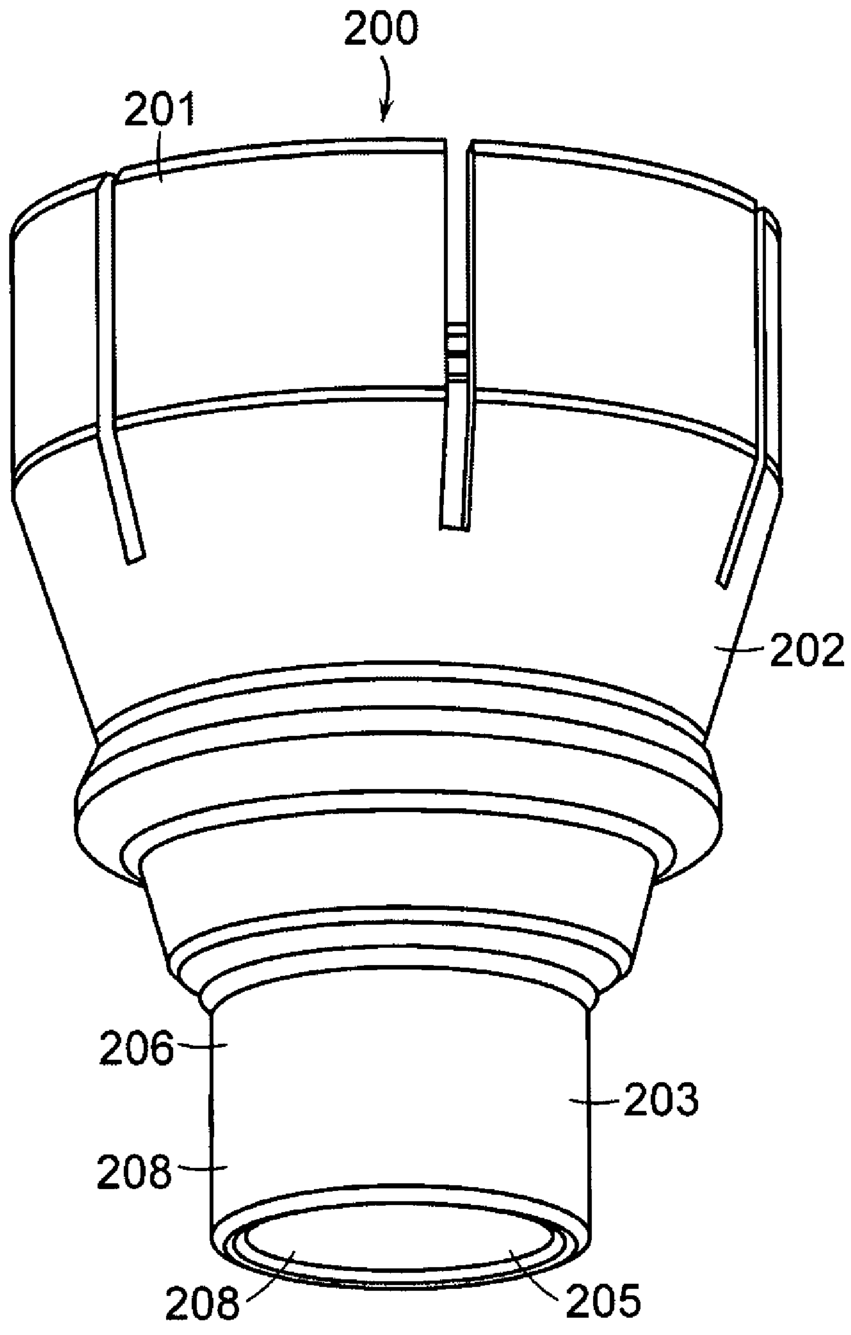
FIG. 2A is a perspective view of a dielectrically coated shield having spring tangs for easy connection and disconnection relative to the torch.

FIG. 2A shows a perspective view of an embodiment of a dielectrically coated shield 200. The dielectrically coated shield 200 has spring tangs 201 for quick removal and attachment to the plasma arc torch 100. In addition, the dielectrically coated shield 200 includes a frustro-conically upper body portion 202 integrated with a cylindrically shaped lower body portion 203. The upper and lower body portions 202 and 203 can be formed of the same non-ceramic material. Alternatively, in some embodiments, the upper and lower portions 202 and 203 are formed from different non-ceramic materials. For example the upper portion 202 can be made of a copper alloy, while the lower portion 203 can be formed of copper, aluminum, or steel. In the embodiment shown in FIG. 2A, interior and exterior surfaces 205 and 206 of the shield 200 are coated with a dielectric coating 208.

Figure 2B:
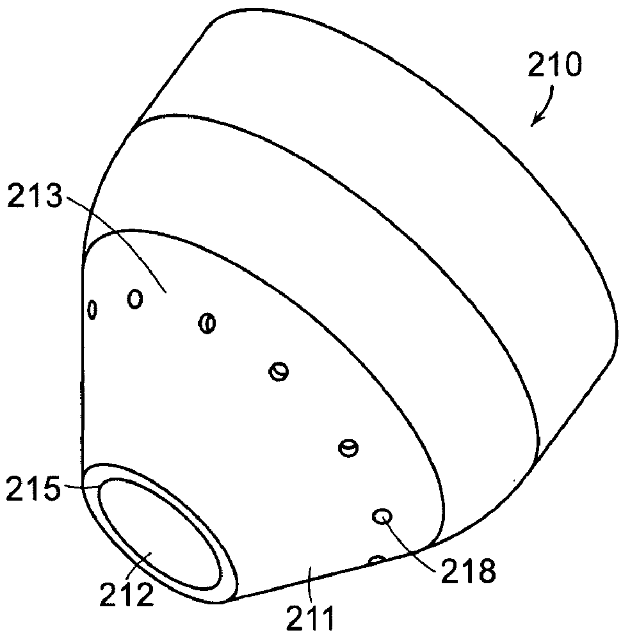
FIG. 2B is a perspective view showing a dielectrically coated shield having a single dielectric coating disposed over the entirety of the shield.

The dielectric coating can be applied to the different portions of the shield and cover various percentages of the surface of the shield. The thickness of the dielectric coating and percentage of shield surface area coated is such that only a portion of the surface of the shield large enough to electrically isolate the nozzle needs to be coated. For example, if only 30 percent of an interior surface of the shield surrounds the nozzle, then about 30 percent of that interior surface is dielectrically coated. In some embodiments, 5, 10, 15, 20, 25, 30, 40, 50, 60, 70, 80, 90, 99, 99.9 or more percent of a surface of the shield can be dielectrically coated. Alternatively, in some embodiments, it is desirable to coat the entire surface area of the shield (e.g., both interior and exterior surface area and the end face), such as by dielectric coating using an anodized bath. In the embodiment shown in FIG. 2B, dielectrically coated shield 210 includes a dielectric material disposed over both interior surface 212 and exterior surface 213, as well as end face 215. In certain embodiments, the dielectric coating is even disposed within openings 218 configured for cooling or shielding gas flow.

The dielectric coating 211 can be formed of any type of dielectric material, such as, for example, porcelain, plasma sprayed ceramics, ceramic paint, titanium oxide, aluminum oxide, or any anodized material. Anodization of material occurs, for example, when a conductive substrate material, such as copper or aluminum, is submerged in an acidic charged bath, which causes an exterior surface of the material to oxidize and become non-conductive. An advantage of an anodized material, such as anodized aluminum, is that it can make an otherwise conductive durable material electrically insulative, therefore electrically insulating the shield while, e.g., absorbing torch head-to-workpiece impacts.

There are numerous combinations of non-ceramic substrates and dielectric coatings materials. Examples of some combinations include porcelain on a steel substrate, plasma spray ceramic on a copper substrate, ceramic paint on a steel substrate, titanium oxide on a titanium substrate, anodized aluminum on an aluminum substrate, anodized copper on a copper substrate, and ceramic on a plastic substrate. Other combinations are also possible.

Figure 2C:
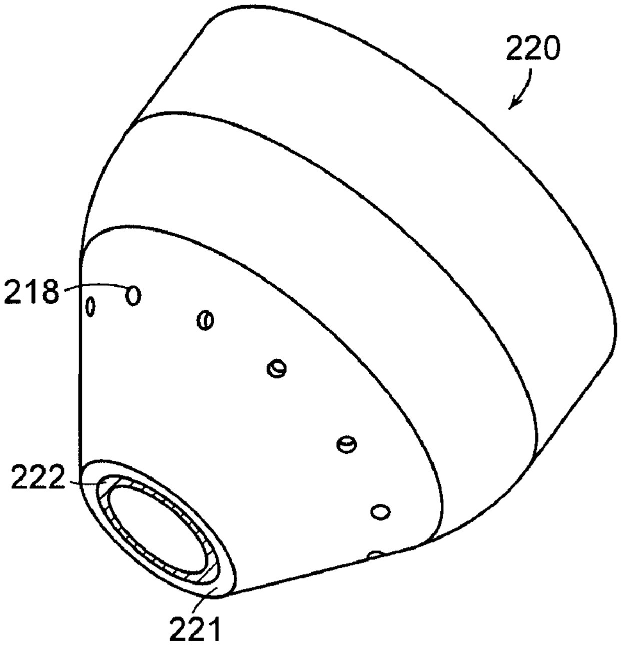
FIG. 2C is a perspective cross sectional view showing a dielectrically coated shield with multiple dielectric coatings and/or layers.

FIG. 2C shows another embodiment of a dielectric shield 220 having multiple dielectric coatings. For example, the bottom layer 222 can be an insulative ceramic coating and the top layer 221 can be a durable coating that is either insulative or conductive (e.g., a polymer layer or a chromate layer). By using multiple layers to form the coating, the material properties of the shield 220 can be enhanced. For example, by including a durable layer on top of a less durable or fragile layer, the durability of the coating is enhanced while its complementary property of electrical insulation is achieved by the bottom layer 222. Another possible embodiment includes providing multiple dielectric layers, such that the body of the shield is dielectrically coated multiple times to increase material strength and resist torch head-to-workpiece impacts. There are many ways to dielectrically coat materials, for example, by chemical vapor deposition (see, e.g., U.S. Pat. No. 5,451,550), physical vapor deposition, vacuum deposit (see, e.g., U.S. Pat. No. 5,312,647), powder coating, spraying (see, e.g., U.S. Pat. No. 5,900,282), dipping, overmolding and/or brushing, each of which can be used with the invention.

Figure 3A:
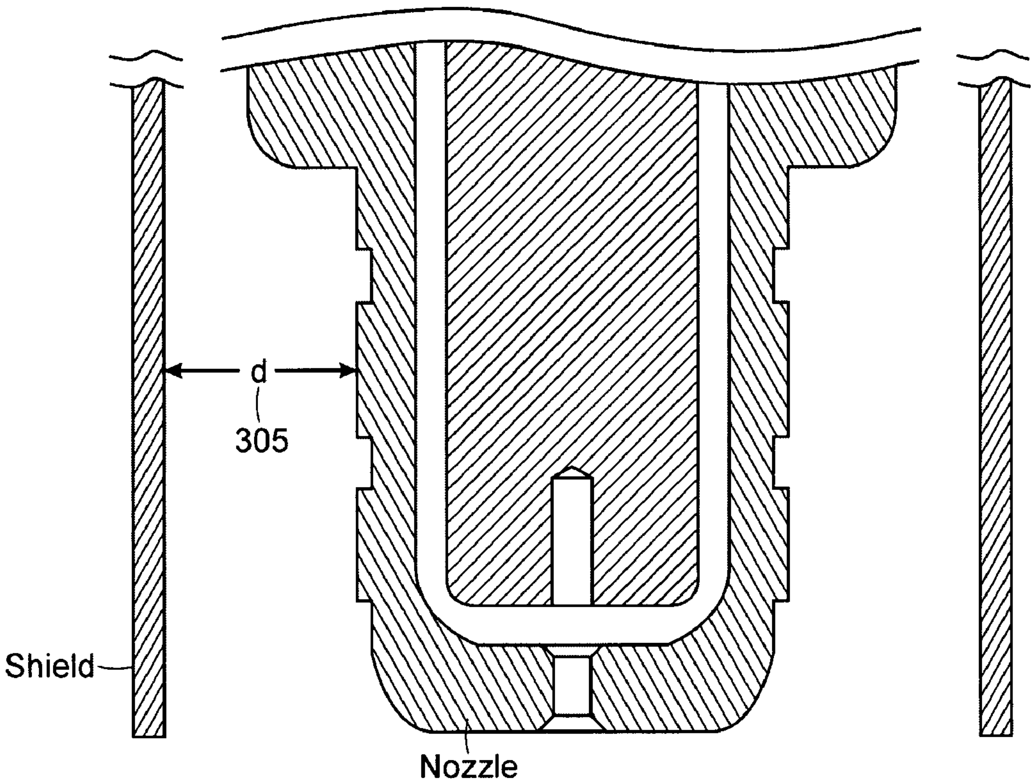
FIG. 3A is a cross sectional view of a portion of a torch head including a nozzle surrounded by a conductive shield located at an arcing distance away from the nozzle.
Figure 3B:
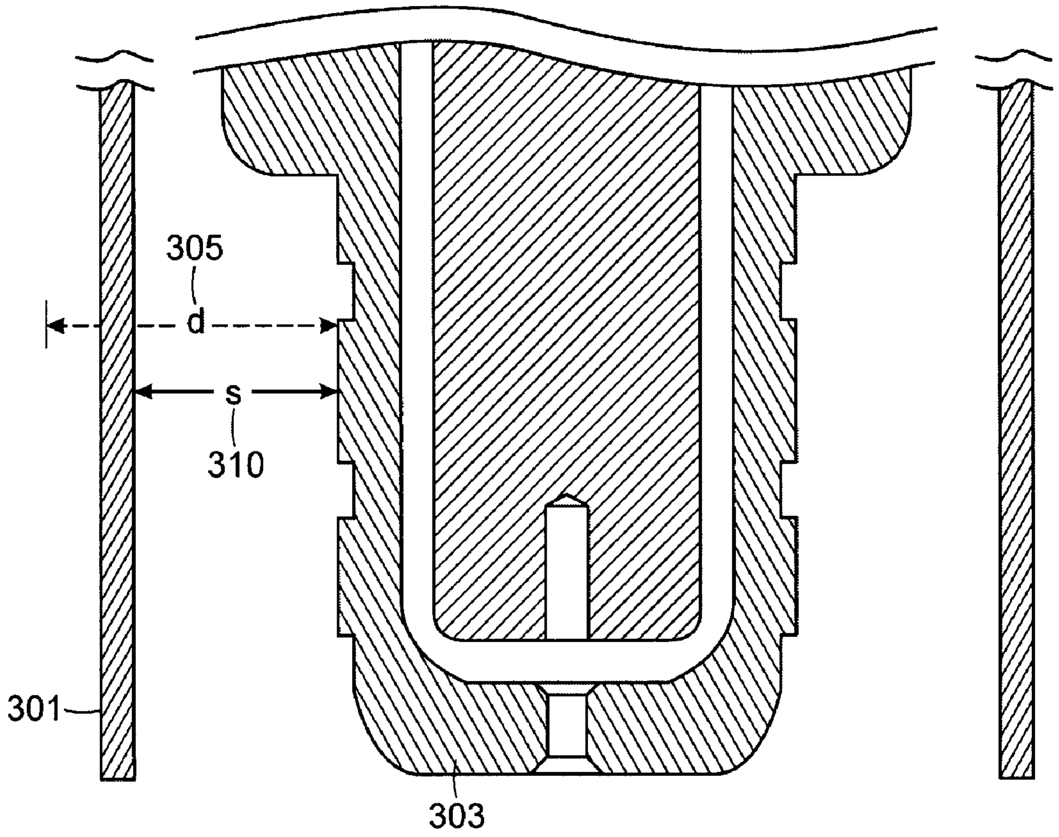
FIG. 3B is a cross sectional view of a portion of a torch head including a dielectric shield located a distance less than the arcing distance of FIG. 3A away from the nozzle.
Figure 3C:
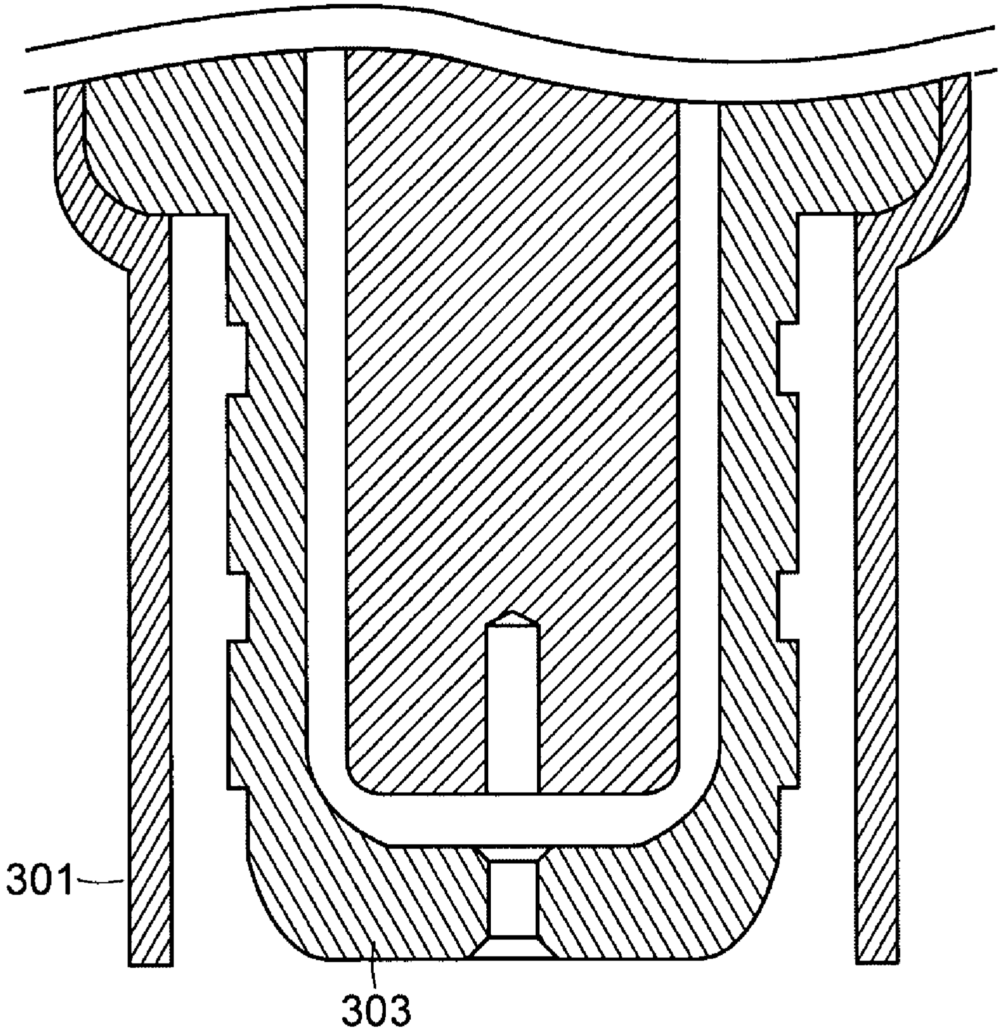
FIG. 3C is a cross sectional view of a portion of a torch head including a dielectric shield having a surface in contact with the nozzle.
Figure 3D:
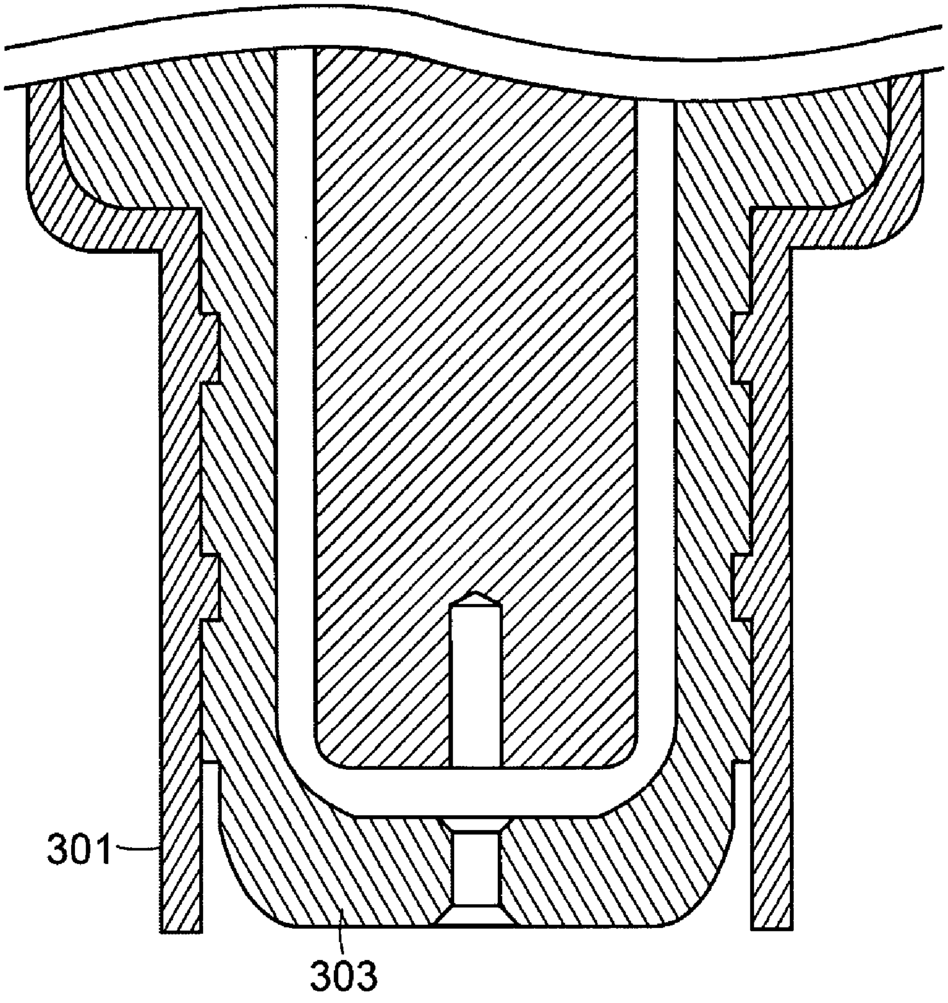
FIG. 3D is a cross sectional view of a portion of a torch head including a dielectric shield in direct contact with a nozzle.

As previously described, conventional conductive shields require a gap or spacing from the nozzle equal to or greater than the arcing distance d, 305, in order to decrease or prevent the occurrence of double arcing. FIG. 3A illustrates the minimum distance d, 305 required in conventional torches. Due to the isolative properties of the dielectric coating, shields in accordance with the present technology, such as, for example shield 301, can be positioned at a smaller distance s, 310, away from the nozzle 303 (i.e., within the arcing distance 305) as shown in FIG. 3B. By providing a small gap 310 between the nozzle and the shield cooling gasses can flow through the gap 310 and cool the exterior of the nozzle 303, while at the same time increasing operator visibility over conventional torches that have the larger spacing of d, 305 or greater. In addition, as shown in FIGS. 3C and 3D, at least a portion of the shield 301 can be in direct contact with the nozzle 303 while still preventing double arcing events. Positioning the dielectric shield 301 in contact with the nozzle 303 is advantageous because it reduces the total overall width of the torch head, thereby permitting better operator visibility of the workpiece and plasma arc. Direct contact between the nozzle and the shield can also reduce or eliminate slag wedged between the shield and nozzle. To cool the nozzle 303 in direct contact embodiments, the nozzle 303 and/or shield 301 includes flutes to form fluid passageways for flow of a cooling gas about the exterior of the nozzle. The gas used to cool the nozzle 303 and shield 301 escapes through openings disposed within the shield (e.g., openings 218 shown in FIGS. 2B and 2C).

Figure 4:
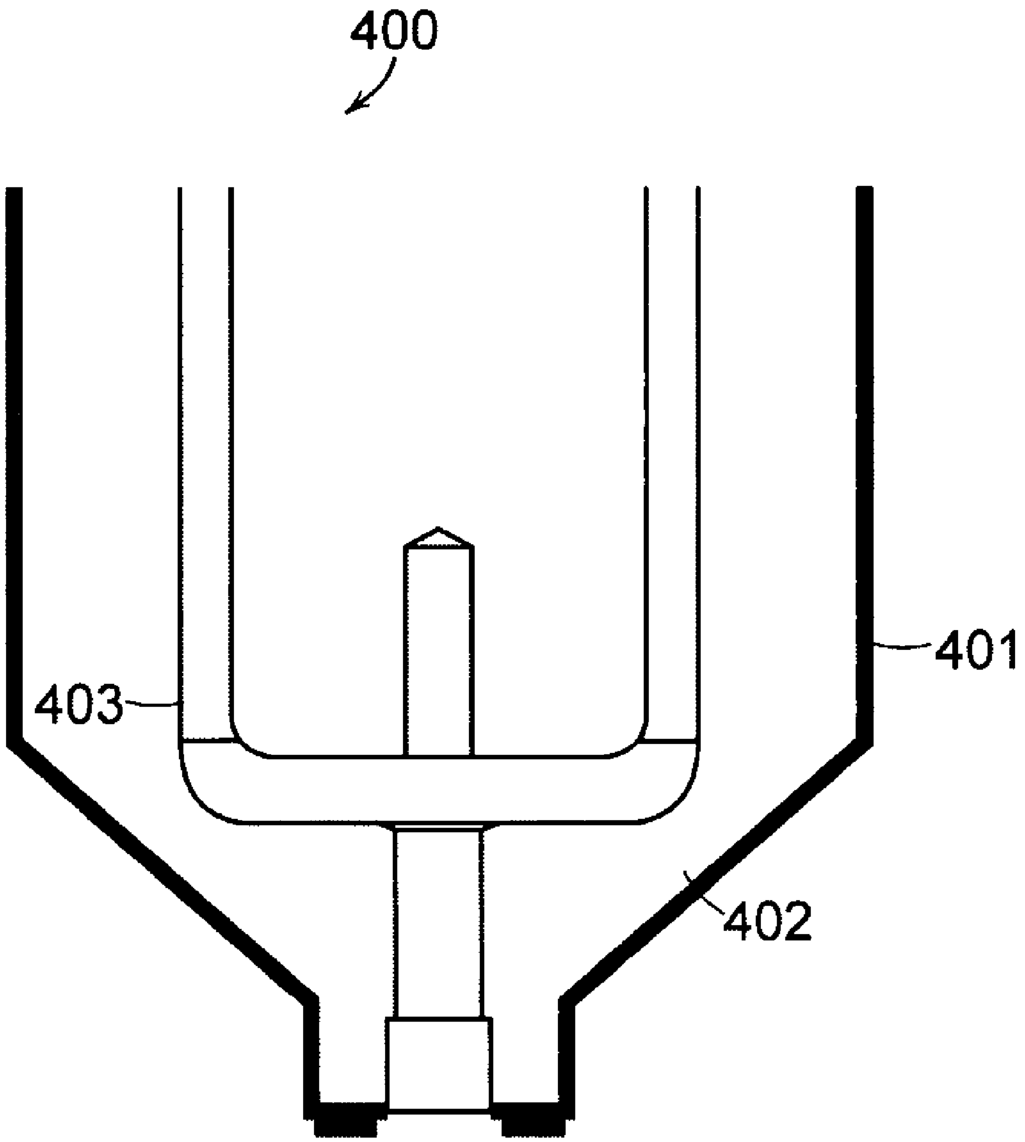
FIG. 4 is a vertical cross sectional view of a torch head with a dielectrically coated nozzle.

While the above embodiments show a dielectrically coated shield device for protecting the nozzle from double arcing events, there are other devices that can also be used. For example, embodiments can feature a plasma arc torch having a nozzle with a dielectric coating disposed on an exterior surface. Referring to FIG. 4, a dielectric coating 401 can be disposed on an exterior surface of the nozzle head 402 of a nozzle 400 for a plasma arc torch. In cutting situations where a shield is not needed to protect the nozzle 400 from collision, one or more dielectric coating(s) 401 on the nozzle head 402, (e.g., on an exterior surface of the nozzle) prevents arcing with the nozzle and increases operator visibility by reducing the total cross-sectional area and width of the torch head (e.g., the nozzle and electrode). The dielectric coating 401 need not be applied to an interior surface 403 of the nozzle head. One skilled in the art will recognize that the one or more dielectric coating(s) must be applied to a portion of a nozzle 400 that electrically insulates the electrode and maintains nozzle conductivity for the pilot arc between the electrode and the nozzle head portion during pilot arc operation of the torch. The dielectrically coated nozzle head portion 402 may be formed of copper or aluminum and is coated with an insulative material 401. In certain embodiments, a nozzle hollow body portion 404 integrally connected to the nozzle head 402 is formed of the same material as the nozzle head portion 402. In other embodiments, the nozzle body portion is formed from a different material than the nozzle head 402. Examples of materials for use as the nozzle head portion 402 and/or the nozzle body portion 404 include, copper, aluminum, steel, gold, silver, titanium, and alloys thereof. The dielectric coating 401 material can be made of any dielectric, electrically insulating material, such as ceramics or an anodized metal layer.

Figure 5:
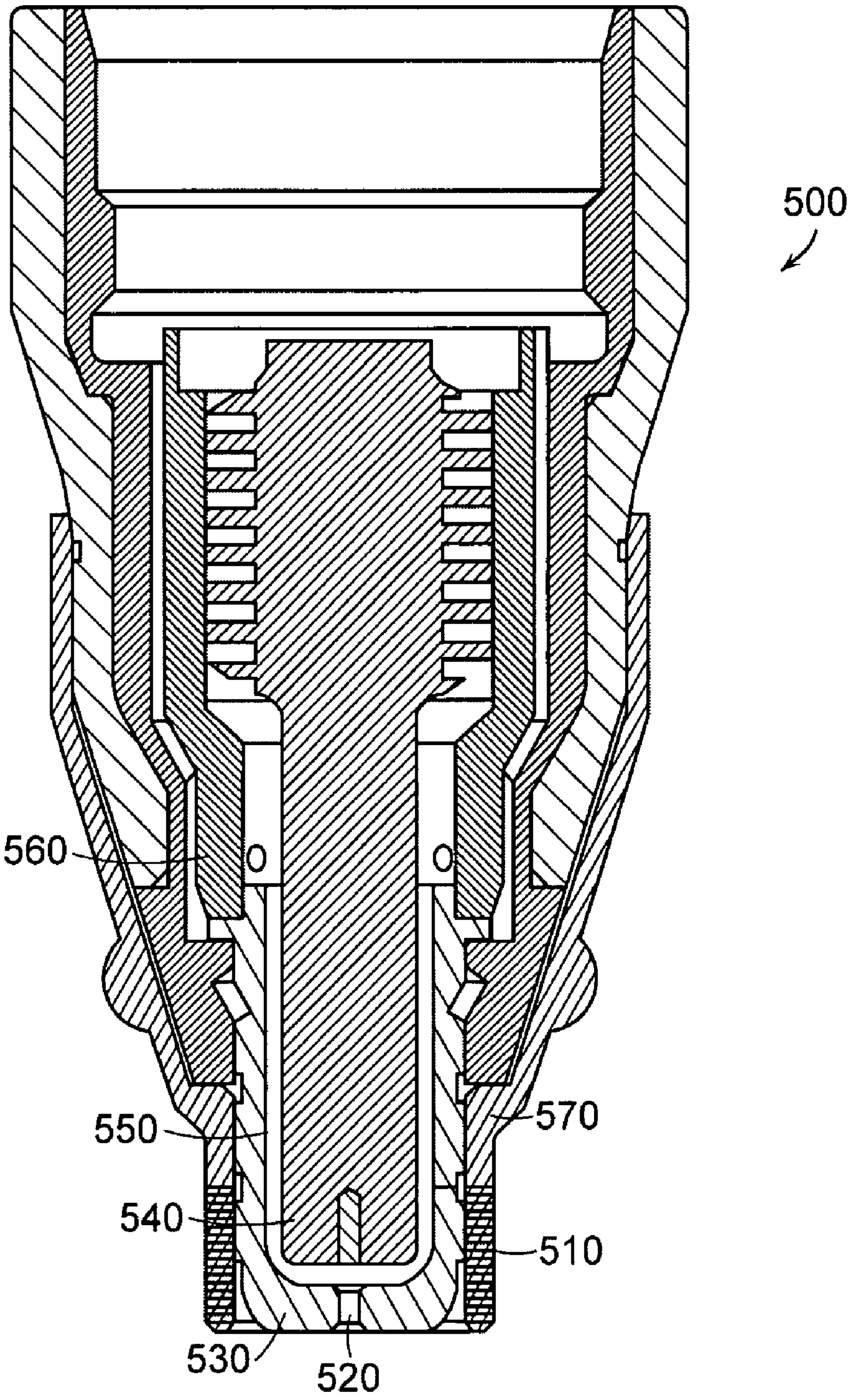
FIG. 5 is a vertical cross sectional view of an embodiment of the plasma arc torch with an electrode, a nozzle with a central exit orifice, a retaining cap, and a shield having multiple portions.

Another embodiment of the invention features a dielectric shield that has connectable portions. For example, FIG. 5 shows the shield with a bottom portion 510 connected to a top portion 570. These two portions are mechanically connectable to form the dielectric shield. Other embodiments include a shield that has a bottom portion 510 that disconnects from a top portion 570. Another example is a dielectrically coated shield that includes a bottom portion 510 that connects and disconnects to a top portion 570. An advantage of connecting and disconnecting two shield portions is that the bottom portion can be made out of an expensive robust material, which easily protects the nozzle, without having to manufacture the entire shield of the expensive material. Slag created during torch operation is more likely to attach to the bottom part of the shield. Over time, the slag builds up or the bottom part of the shield wears away to a point that the shield needs replacement. By providing detachable top and bottom shield portions, replacement of only bottom portion 510 of the shield is necessary.

To protect an electrode and a nozzle from double arcing and damaging contact with a workpiece caused by poor operator visibility, an operator can remove an old or used shield surrounding the nozzle, and secure a shield including a non-ceramic substrate and a dielectric coating to the torch body. The shield should be secured such that at least a portion of the nozzle is covered by the shield. Thus, the shield with its dielectric coating electrically insulates the nozzle from the workpiece, thereby decreasing damage caused by double arcing. To further protect the nozzle and the electrode, cooling gas is flowed through the torch body between the nozzle and the shield. As a result, the consumable portions of the torch are cooled during use and wear at a slower rate than without the cooling.

A nozzle and electrode can also be protected against double arcing by mounting a nozzle including at least one dielectric coating on its exterior surface to the torch body. Specifically, by mounting a nozzle with a dielectric coating on its exterior, such as the nozzle illustrated in FIG. 4, to a torch body, the electrode becomes insulated from double arcing events due to the dielectric coating on the exterior of the nozzle. In addition, the operator does not have to secure an additional shield over the nozzle. As a result, operator visibility of the plasma arc is maximized because the nozzle is no longer covered by or obstructed by the shield and optional shield assembly. The nozzle can be further protected by flowing cooling gas over a portion of the exterior surface of the nozzle during operation. There are many possible embodiments of a dielectrically coated nozzle (400, 401). For example, the dielectrically coated nozzle can include multiple coatings some which can be formed of dielectric materials. In certain embodiments, it is advantageous to apply multiple dielectric coatings. The dielectrically coated nozzle can also have various configurations. For example, the dielectrically coated nozzle can also include flutes 177 (see FIG. 1B) or other passageways through or around the nozzle head and/or body portions.

All patents cited here are incorporated by reference in their entirety. One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes, which come within the meaning and range of equivalency of the claims, are therefore intended to be embraced therein.

What is claimed is:

1. A dielectric shield for use in a plasma arc torch, the plasma arc torch including a nozzle and an electrode, the plasma arc torch in operation generating a plasma arc that passes from the electrode through the nozzle to process a workpiece, the dielectric shield comprising:

a metallic body having a side wall, an end face extending generally transversely to a plasma that exits through an orifice in the end face and processes the workpiece;

a dielectric coating disposed on the exterior surfaces of the metallic body, the dielectric coating to thereby prevent a current path from forming between the workpiece and the metallic body during a processing of the workpiece.

2. The dielectric shield of claim 1 wherein the dielectric coating comprises an anodized material.

3. The dielectric shield of claim 1 wherein the end face of the shield includes the dielectric coating.

4. The dielectric shield of claim 1 wherein the metallic body comprises an electrically conductive material.

5. The dielectric shield of claim 1 wherein the anodized material is anodized aluminum.

6. The dielectric shield of claim 1 wherein the shield includes multiple coatings disposed on the metallic body.

7. The dielectric shield of claim 6 wherein the multiple coatings are layered.

8. The dielectric shield of claim 1 wherein the dielectric coating is on an interior surface of the metallic body.

9. The dielectric shield of claim 1 wherein the dielectric coating is applied to an entirety of the surface area of the shield.

10. The dielectric shield of claim 4 wherein the dielectric coating is applied to an aluminum substrate.

11. The dielectric shield of claim 4 wherein the dielectric coating is on an exterior surface of the shield.

12. The dielectric shield of claim 1 wherein the dielectric coating comprises a ceramic layer.

13. The dielectric shield of claim 1 further comprising:

spring tangs for at least one of connecting or disconnecting the shield from the plasma arc torch.

14. The dielectric shield of claim 1 wherein the shield includes multiple connecting portions.

15. The dielectric shield of claim 1 wherein the shield includes multiple disconnecting portions.

16. The dielectric shield of claim 1 wherein at least a portion of the shield contacts at least a portion of the nozzle.

17. A torch head for use in a plasma arc torch, the plasma arc torch including a nozzle and an electrode, the plasma arc torch in operation generating a plasma arc that passes from the electrode through the nozzle to process a workpiece, the torch head comprising:

a nozzle mounted relative to an electrode in a torch body to define a plasma chamber in which a plasma arc is formed, the nozzle comprising a conductive nozzle body portion and defining a nozzle exit orifice extending therethrough; and a dielectric shield capable of being secured to the torch body such that at least a portion of a surface of the shield directly contacts the nozzle body portion, the dielectric shield at least partially defining a cooling passage for providing a cooling gas to the torch head and comprising a metallic body being dimensioned to inhibit the nozzle from protruding past the end face of the metal body when the metallic body is attached to the plasma arc torch;

a dielectric coating disposed on the metallic body, the dielectric coating sufficient to prevent a current path from forming between the workpiece and the metallic body during processing of the workpiece.

18. The torch head of claim 17, wherein the dielectric shield comprises an electrically conductive body.

19. The torch head of claim 17, wherein the dielectric shield comprises an anodized body.

20. The torch head of claim 19, wherein the anodized body comprises an anodized aluminum body.

21. The torch head of claim 17, wherein the dielectric shield electrically isolates the nozzle body portion.

22. The torch head of claim 17, wherein the surface is an interior surface.

23. The torch head of claim 17, wherein the nozzle comprises:

a hollow nozzle body portion; and a nozzle head portion in contact with the hollow nozzle body portion and defining a nozzle exit orifice extending therethrough, a surface of the nozzle head portion having multiple coatings disposed thereon, at least one of the multiple coating comprising a dielectric material.

24. The nozzle of claim 23, where the hollow nozzle body portion comprises copper.

25. The nozzle of claim 23, where the nozzle head portion comprises copper.

26. The nozzle of claim 23, where the nozzle head portion comprises at least one of copper or aluminum.

27. A method of protecting a plasma arc torch including an electrode and a nozzle disposed within a torch body, the method comprising:

securing a shield having a metallic body, a side wall, an end face extending generally transversely to a plasma that exits through an orifice in the end face and processes the work piece; and preventing a current path from forming between the workpiece and the metal body during processing of the workpiece by dielectrically coating the metal body.

28. The method of claim 27, wherein the shield includes a metallic, conductive body.

29. The method of claim 27, wherein the dielectric coating comprises an anodized material.

30. The method of claim 27, wherein dielectrically coating the metal body comprises dielectrically coating an interior surface of the metal body.

31. The method of claim 27 wherein dielectrically coating the metal body comprises dielectrically coating the entire surface area of the shield.

* * * * *